United States Patent
Casper et al.

(10) Patent No.: US 9,736,904 B2
(45) Date of Patent: *Aug. 15, 2017

(54) SELECTABLE, ZONE-BASED CONTROL FOR HIGH INTENSITY LED ILLUMINATION SYSTEM

(71) Applicant: Ephesus Lighting, Inc., Syracuse, NY (US)

(72) Inventors: Joseph R. Casper, Syracuse, NY (US); Christopher D. Nolan, Syracuse, NY (US); Joseph J. Witkowski, Syracuse, NY (US); Jeff R. Shuster, Syracuse, NY (US); Brian M. Wilson, Syracuse, NY (US)

(73) Assignee: Ephesus Lighting, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,471

(22) Filed: Nov. 16, 2015

(65) Prior Publication Data

US 2016/0073470 A1    Mar. 10, 2016

Related U.S. Application Data

(63) Continuation of application No. 14/573,553, filed on Dec. 17, 2014, now Pat. No. 9,189,996.
(Continued)

(51) Int. Cl.
*G09G 3/34*  (2006.01)
*H05B 33/08*  (2006.01)
*H05B 37/02*  (2006.01)

(52) U.S. Cl.
CPC ....... *H05B 33/0869* (2013.01); *G09G 3/3406* (2013.01); *G09G 3/3413* (2013.01);
(Continued)

(58) Field of Classification Search
CPC combination set(s) only.
See application file for complete search history.

(56) References Cited

U.S. PATENT DOCUMENTS 6,933,486 B2  8/2005  Pitigoi-Aron et al.
7,161,311 B2  1/2007  Mueller et al.
(Continued)

FOREIGN PATENT DOCUMENTS

CN    202721868 U    2/2013
CN    202918552 U    5/2013
(Continued)

OTHER PUBLICATIONS

"How to Choose the Right LED Lighting Product Color Temperature", downloaded from internet Dec. 4, 2014, http://www.seesmartled.com/kb/choosing_color_temperature/.

*Primary Examiner* — Van Chow
(74) *Attorney, Agent, or Firm* — Fox Rothschild LLP

(57) ABSTRACT

A lighting system includes a group of light emitting diode (LED) illumination devices. A controller may identify a set of the illumination devices that correspond to a zone, and to generate commands to cause the device drivers for each of the identified illumination devices to control its corresponding illumination device so that a specified color temperature, illuminance level, or both of light will be received at a location in the zone. A method for calibrating such a system is also disclosed. A user interface allows a user to select a scene after the calibration is complete.

19 Claims, 10 Drawing Sheets

Related U.S. Application Data

(60) Provisional application No. 61/917,054, filed on Dec. 17, 2013.

(52) U.S. Cl.
CPC ..... *H05B 33/0845* (2013.01); *H05B 33/0848* (2013.01); *H05B 33/0857* (2013.01); *H05B 33/0863* (2013.01); *H05B 33/0866* (2013.01); *H05B 37/0218* (2013.01); *H05B 37/0272* (2013.01); *G09G 2320/0233* (2013.01); *G09G 2320/0633* (2013.01); *G09G 2330/021* (2013.01)

(56) References Cited

U.S. PATENT DOCUMENTS

| | | | |
|---|---|---|---|
| 7,365,991 B2 | 4/2008 | Aldrich et al. | |
| 7,405,715 B2 | 7/2008 | Guzman et al. | |
| 7,924,174 B1 | 4/2011 | Gananathan | |
| 8,104,925 B2 | 1/2012 | Gordin | |
| 8,278,846 B2 | 10/2012 | Roberts et al. | |
| 8,358,089 B2 | 1/2013 | Hsia et al. | |
| 8,456,109 B1 | 6/2013 | Wray | |
| 8,575,861 B1 | 11/2013 | Gordin et al. | |
| 8,766,555 B2 | 7/2014 | Tu et al. | |
| 8,841,859 B2 | 9/2014 | Chemel et al. | |
| 8,890,435 B2 | 11/2014 | Bora et al. | |
| 9,101,029 B2 | 8/2015 | Shamoto et al. | |
| 9,189,996 B2 | 11/2015 | Casper et al. | |
| 9,408,271 B2 | 8/2016 | Casper et al. | |
| 2005/0099824 A1 | 5/2005 | Dowling et al. | |
| 2006/0098077 A1 | 5/2006 | Dowling | |
| 2009/0052179 A1 | 2/2009 | Hammel | |
| 2010/0102729 A1 | 4/2010 | Katzir et al. | |
| 2011/0089866 A1 | 4/2011 | Trotter et al. | |
| 2011/0260652 A1 | 10/2011 | Hsieh | |
| 2012/0326631 A1 | 12/2012 | Naruo et al. | |
| 2014/0062297 A1 | 3/2014 | Bora et al. | |
| 2014/0210368 A1 | 7/2014 | Lee et al. | |
| 2014/0334149 A1 | 11/2014 | Nolan et al. | |
| 2015/0167922 A1 | 6/2015 | Casper et al. | |
| 2015/0167937 A1 | 6/2015 | Casper et al. | |
| 2015/0173147 A1 | 6/2015 | Casper et al. | |
| 2015/0173148 A1 | 6/2015 | Casper et al. | |

FOREIGN PATENT DOCUMENTS

| | | | |
|---|---|---|---|
| EP | 1528785 A1 | 5/2005 | |
| WO | WO-2013090536 A1 | 6/2013 | |

SELECTABLE, ZONE-BASED CONTROL FOR HIGH INTENSITY LED ILLUMINATION SYSTEM

RELATED APPLICATIONS AND CLAIM OF PRIORITY

This patent document claims priority to and is a continuation of U.S. patent application Ser. No. 14/573,553, filed Dec. 17, 2014, which in turn claims priority to U.S. Provisional Patent Application No. 61/917,054, filed Dec. 17, 2013. The disclosures of each of the priority applications are fully incorporated into this document by reference.

The patent document is related to U.S. patent application Ser. No. 14/573,521, U.S. patent application Ser. No. 14/573,584, U.S. patent application Ser. No. 14/573,619 and U.S. patent application Ser. No. 14/573,668, each filed Dec. 17, 2014. The disclosures of each related application are fully incorporated into this document by reference.

BACKGROUND

Entertainment facilities such as stadiums, arenas and concert halls seek ways to offer unique experiences with lighting and special effects. However, the current methods of providing such effects through lighting have been limited because of the manual operation required to change colors, intensities and positions associated with overhead light fixtures. In addition, the ability to rapidly change lighting effects is limited due to the significant amount of time that it takes to start and illuminate high intensity discharge fixtures, such as high intensity discharge lamps. Further, because of the amount of light required to be emitted by many stadium lights, the lights may require a significant amount of energy and may generate a substantial amount of heat.

In addition, in certain facilities such as stadiums and sports arenas, the events that occur in the arena have very specific lighting specifications. For example, a hockey league may require relatively cool light of a color temperature of approximately 5500K, while a concert may desire a slightly warmer light of a color temperature of approximately 4000K. It is very expensive for facilities to maintain a variety of light fixtures to meet all of these specifications.

This document describes new illumination devices and control systems that are directed to solving the issues described above, and/or other problems.

SUMMARY

In an embodiment, a lighting system includes a group of light emitting diode (LED) illumination devices. Optionally, each illumination device may include a first group of LEDs of a first color temperature, a second group of LEDs of a second color temperature, and device driver. The system also includes a user interface comprising one or more user input structures, and a controller comprising a processor and a non-transitory memory containing programming. The programming is configured to cause the processor to receive a selection of a scene from the user interface. The scene corresponds to a requirement to direct light of a specified color temperature and illuminance level to a location. The programming causes the processor to identify a set of the illumination devices that correspond to the scene, and to generate commands to cause the device drivers for each of the identified illumination devices to control its corresponding illumination device so that the specified color temperature and illuminance level of light will be received at the location. The controller will transmit the commands to the device drivers for the illumination devices that correspond to the scene.

Optionally, when generating the commands, the system may identify a drive current for each group of LEDs, and it may include the identified drive current for each group in the group's command so that the device emits light at the substantially constant illuminance level. For example, the device drivers may control the identified illumination devices so that the specified color temperature of light will be received at the location by increasing the drive current delivered to the first group of LEDs and decreasing the drive current delivered to the second group of LEDs in each illumination device that corresponds to the scene. To control the identified illumination devices so that the specified illuminance level of light is received at the location, the device drivers may automatically reduce the brightness of one of the groups of LEDs by decreasing a width of voltage pulses applied to that group of LEDs or increasing spacing between voltage pulses applied to one group of LEDs, and increasing the brightness of the other group of LEDs by increasing a width of voltage pulses applied to that group of LEDs or decreasing spacing between voltage pulses applied to that other group of LEDs.

Optionally, to identify the group of LED illumination devices that correspond to the selected scene, the system may access a data storage facility comprising sets of scene data, retrieve a set of scene data that corresponds to the selected scene, and extract an identification of the group of LED devices that correspond to the selected scene from the retrieved set of scene data.

The system also may include a color temperature sensor positioned in the lighting environment, and programming that is configured to cause the controller to perform a calibration event for a zone in which the sensor is located. To perform the calibration event, the controller may receive color temperature data from the sensor and compare the received color temperature data to a desired color temperature. The controller may then command one or more device drivers for one or more illumination devices associated with the sensor's zone to increase a drive current to a first group of the LEDs in each illumination device associated with the zone and decrease a drive current to a second group of the LEDs in each illumination device associated with the zone until the sensor detects the desired color temperature in the zone. When the sensor detects the desired color temperature, the system may store the drive currents that are then in effect to a data set for the scene.

In addition or alternatively, the system may include a light intensity sensor in the environment. If so, the when performing the calibration event the system may receive light intensity data from the sensor and compare the received light intensity data to a desired intensity level. The system may then command one or more device drivers for one or more illumination devices associated with the sensor's zone to use pulse width modulation to alter brightness of light produced by LEDs in each illumination device associated with the zone until the sensor detects the desired intensity level in the zone. When the sensor detects the desired intensity level, the system may store PWM settings that are then in effect to a data set for the scene.

Optionally, the sensor or sensors may be attached to a robotic transport device. The device may rotate the sensors to collect light characteristic data from multiple angles with respect to a surface, such as a playing surface, stage or the ground.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, the terms "upper" and "lower," as well as "vertical" and "horizontal," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

Figure 1:
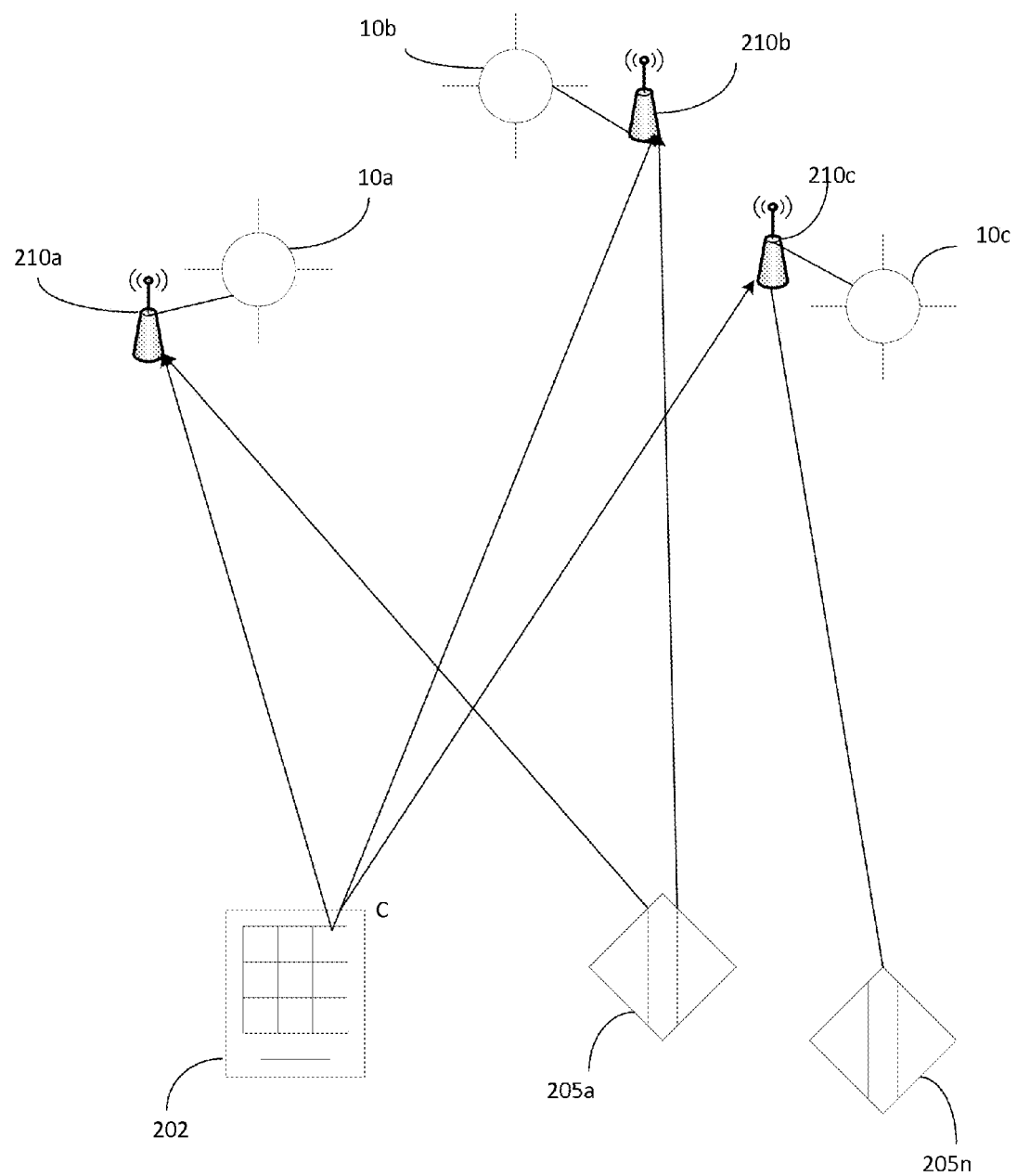
FIG. 1 illustrates an example of a lighting system and control devices for such a system.

FIG. 1 illustrates a lighting system in which any number of lighting devices 10a, 10b, 10c are positioned at various locations in an environment, such as a wall, ceiling, mast, tower or other supporting structure in a stadium, arena, concert hall, outdoor amphitheater or other entertainment facility or other location. Each illumination device may include a number of light emitting diodes (LEDs), and in various embodiments a number of LEDs sufficient to provide a high intensity LED device. Each illumination device may include or be connected to a device controller 210(a), 210(b), 210(c) that includes wiring and circuitry to supply power and/or control signals to one or more lights. A device controller may be an external device, or an integral device that includes various components of an illumination device's control card. Each device controller 210(a), 210(b), 210(c) may include a receiver that receives wireless signals from one or more transmitters. The transmitters may be included in, for example, one or more user interface devices 202.

Each interface device 202 may include selectable user inputs, programming, a processor or circuitry, and a transmitter for transmitting command signals to the various illumination devices. For example, the user inputs may include inputs to turn certain lights in a certain zone of an environment on or off, in which case the interface device will generate and send signals with encoded data that instruct the zone's lights to turn on and off. The user inputs also may include brightness level adjustments for one or more zones and/or lights, or scenes that are designed to set various lighting devices at various brightness levels. Each user input command will cause the user interface device to send a signal that includes data indicating which illumination devices should be operated by the signal. When a control device detects a signal that is intended for its illumination device, it will cause its illumination device to execute the command that corresponds to the control signal.

In addition, any number of external light sensors 205a-205n may be positioned at a location or multiple locations in an environment, such as a stadium playing field, a stage in a concert hall, or a court/floor/ice rink in an area, to detect one or more characteristics of light. The external light sensors may include transmitters that send status information and/or commands to any or all of the illumination device controllers and/or the interface device. For example, a particular illumination device controller 210c may be programmed to detect signals from a particular sensor 205a that is positioned in an area at which the controller's corresponding light fixture 10c directs light. The sensor may sense light intensity, color temperature and/or color rendering index (CRI) in its vicinity and transmit intensity data to the device controller 210c. The device controller 210c may be programmed to increase the LED device's 10c brightness if the local intensity data is less than a threshold, or it may decrease the LED device's 10c brightness if the local intensity data is greater than a threshold. As described above, the controller may do this by increasing or decreasing the frequency of "on" signals that cycle the LEDs on and off by PWM. Alternatively, the sensor 205a itself may include programming and electronics that cause it to send a command to the controller 210c, such as an increase brightness command if local intensity is less than a threshold level or a decrease brightness command if local intensity is greater than a threshold level.

Figure 2:
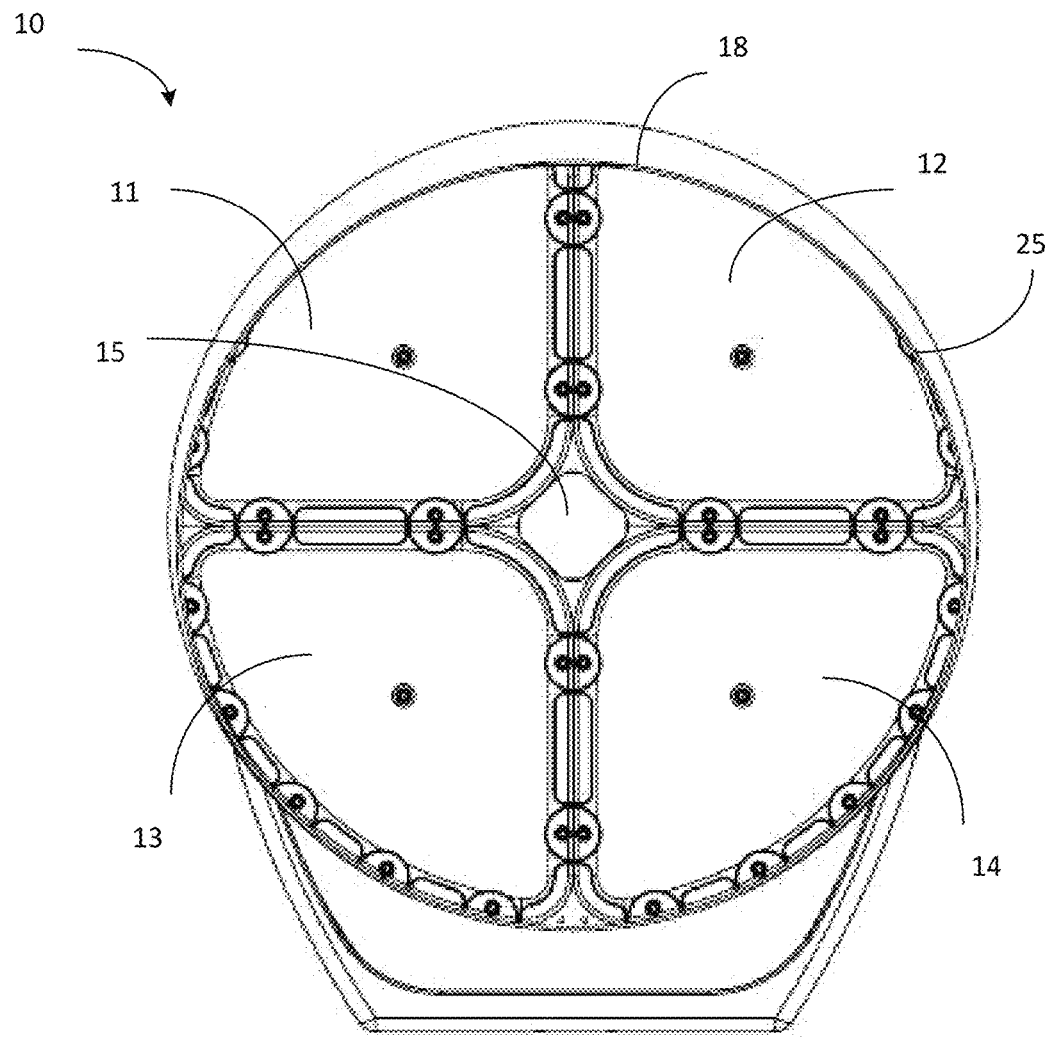
FIG. 2 illustrates a front view of an example of one embodiment of an illumination device that may be used with the system disclosed in this document.
Figure 3:
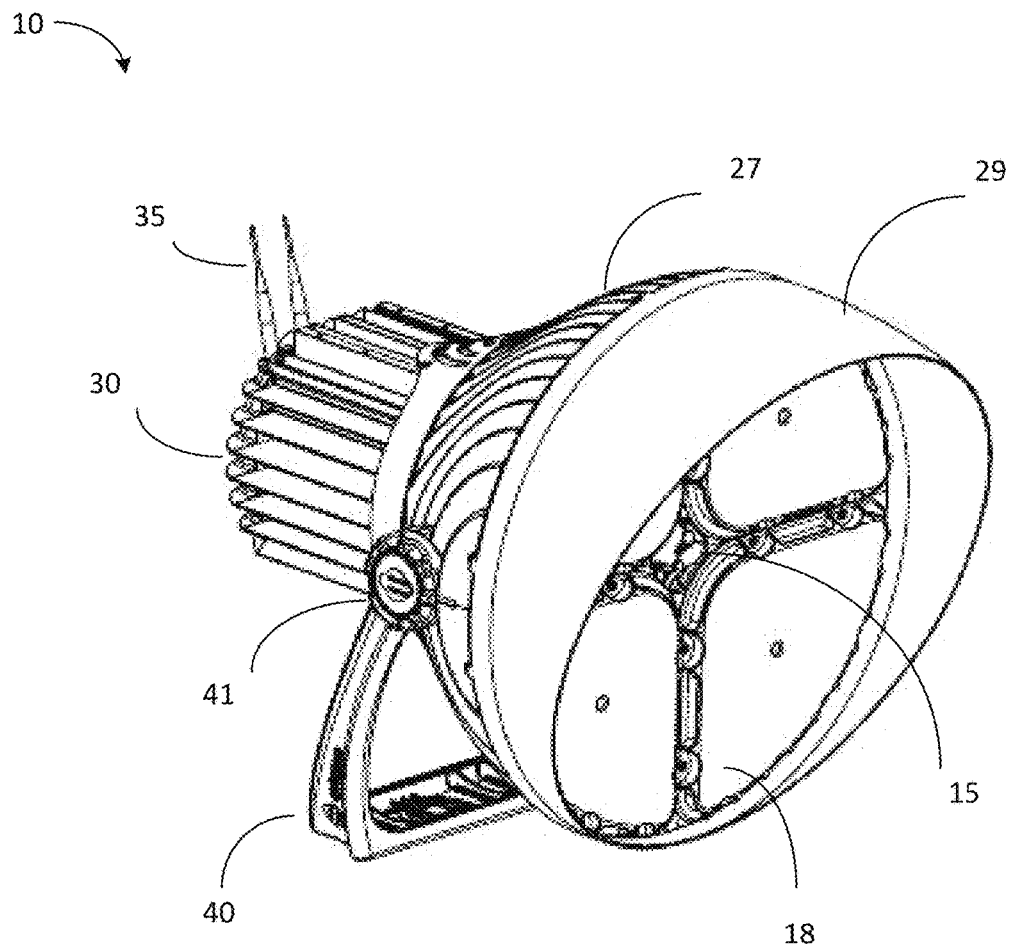
FIG. 3 illustrates a perspective view from a side of the device of FIG. 2.

It is intended that the portions of this disclosure describing LED modules and control systems and methods may include various types of devices. For example, the LED modules, control systems and control methods may include those disclosed in International Patent Application No. PCT/US2012/069442, filed Sep. 13, 2012 by Nolan et al., the disclosure of which is incorporated herein by reference in its entirety. FIG. 2 illustrates a front view of an example of one embodiment of an illumination device that may be used with this system. FIG. 3 illustrates a perspective view from one side of the device of FIG. 2. The illumination device 10 includes a housing 25 that encases various components of a light fixture. The housing 25 includes an opening in which a set of light emitting diode (LED) array modules 11-14 are secured to form a multi-array LED structure 18. The LED array modules 11-14 are positioned to emit light away from the fixture. The opening also provides a sensor compartment 15, which may be enclosed, open or partially open, and via which one or more sensors may detect information about the environment exterior to the device. The sensors may include sensors that detect light, ambient temperature, color temperature or other properties of the ambient area in front of the LED array modules 11-14.

The opening of the housing 25 may be circular as shown, with the sensor compartment 15 for the sensors positioned at the center of the circle and the LED array modules 11-14 positioned around the central open section to form a ring-shaped overall LED structure, although other shapes and configurations are possible. The LED arrays 11-14 may include four arrays, each of which is positioned in a quadrant of the circle as shown. Alternatively, any other number of LED array modules, such as one, two, three, five or more LED array modules, may be positioned within the opening in any configuration.

The device's housing 25 includes a body portion 27 and an optional shroud portion 29. The body portion 27 serves as a heat sink that dissipates heat that is generated by the LED arrays. The body/heat sink 27 may be formed of aluminum and/or other metal, plastic or other material, and it may include any number of fins 22a . . . 22n on the exterior to increase its surface area that will contact a surrounding cooling medium (typically, air). Thus, the body portion 27 may have a bowl shape as shown, the LED array structure 18 may fit within the opening of the bowl, and heat from the LED array modules 11-14 may be drawn away from the array and dissipated via the fins 22a . . . 22n on the exterior of the bowl. In addition, the housing may include a shroud 29 that extends from the body 27 and beyond the LED array module. The shroud may be semi-circular in shape when the multi-array LED structure is circular, and it may be angled or shaped to shield an upper portion of the light assembly from rain while directing, focusing and/or reflecting light so that the light is concentrated in a desired direction (e.g., downward).

While the LED array is positioned at one side of the body 27, the opposing side of the body may include a power supply 30. The power supply 30 may include a battery, solar panel, or circuitry to receive power from an external and/or other internal source. As shown, the external housing of the power supply 30 also may include fins to help dissipate heat from the power supply. Power wiring may be positioned within the body 27 to direct power from the power supply 30 to the LED array modules 11-14.

The housing may be attached to a support structure 40, such as a base or mounting yoke, optionally by one or more connectors 41. As shown, the connectors 41 may include axles about which the housing and/or support structure may be rotated to enable the light assembly to be positioned to direct light at a desired angle.

When the LED array operates, heat generated by the LEDs will rise and dissipate through the heat sink, creating a negative pressure that may draw cool ambient air into the housing via an opening near the sensor compartment 15. This chimney effect helps keep the LED array structure unit cool during operation. FIG. 3 also illustrates that the shroud 29 may have a variable width so that an upper portion positioned at the top of LED structure 18 is wider than a lower portion positioned at the bottom of the LED structure. This helps to reduce the amount of light wasted to the atmosphere by reflecting and redirecting stray light downward to the intended illumination surface.

Figure 4:
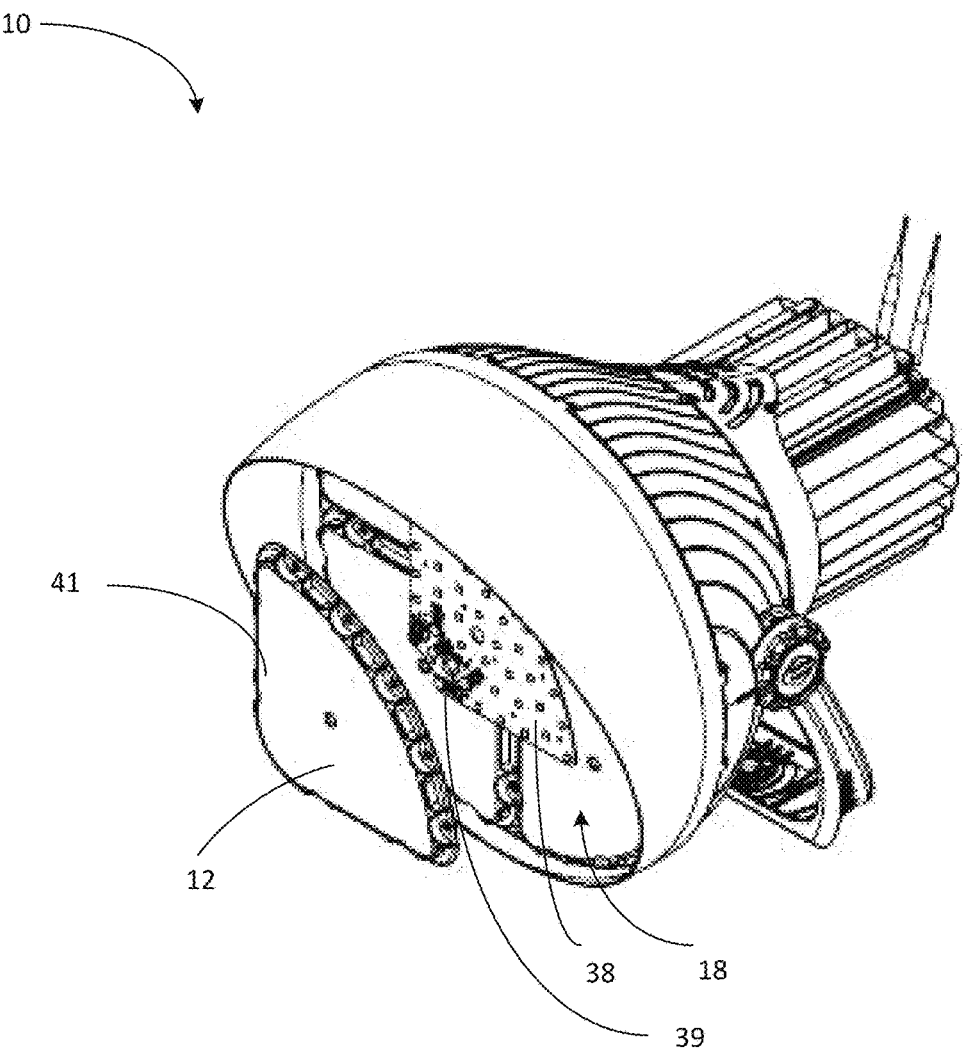
FIG. 4 illustrates an embodiment of the device with an expanded view of an LED module.

FIG. 4 illustrates an embodiment of the device, with an expanded view of one of the LED array modules 12 of the LED structure 18. As shown, the module 12 includes a conductive substrate 38 on which a number of LEDs 39 are positioned. The LEDs 39 may be arranged in one or more rows, matrices, or other arrangements with corresponding components supported in place and/or spaced apart by supports. For example, the LEDs may form matrices of n×n LEDs, such as 4×4 or 8×8 matrices. Alternatively, as shown in FIG. 4, the LEDs in each module 12 may be positioned in curved rows so that when all modules are positioned within the opening, the LED structure 18 comprises concentric rings of LEDs. The substrate 38 may include a portion that is a printed circuit board. Driver circuitry on the circuit board may deliver current to the LEDs, and the LED array modules may include multi-wire connectors with prongs and/or receptacles for connecting to external conductors and/or signal wires, or other LED array modules. A lens cover 41 may be positioned over the substrate 38 to protect the substrate 38 and LEDs 39 from the ambient elements, as well as to focus and/or direct light emitted by the LEDs 39.

Figure 5:
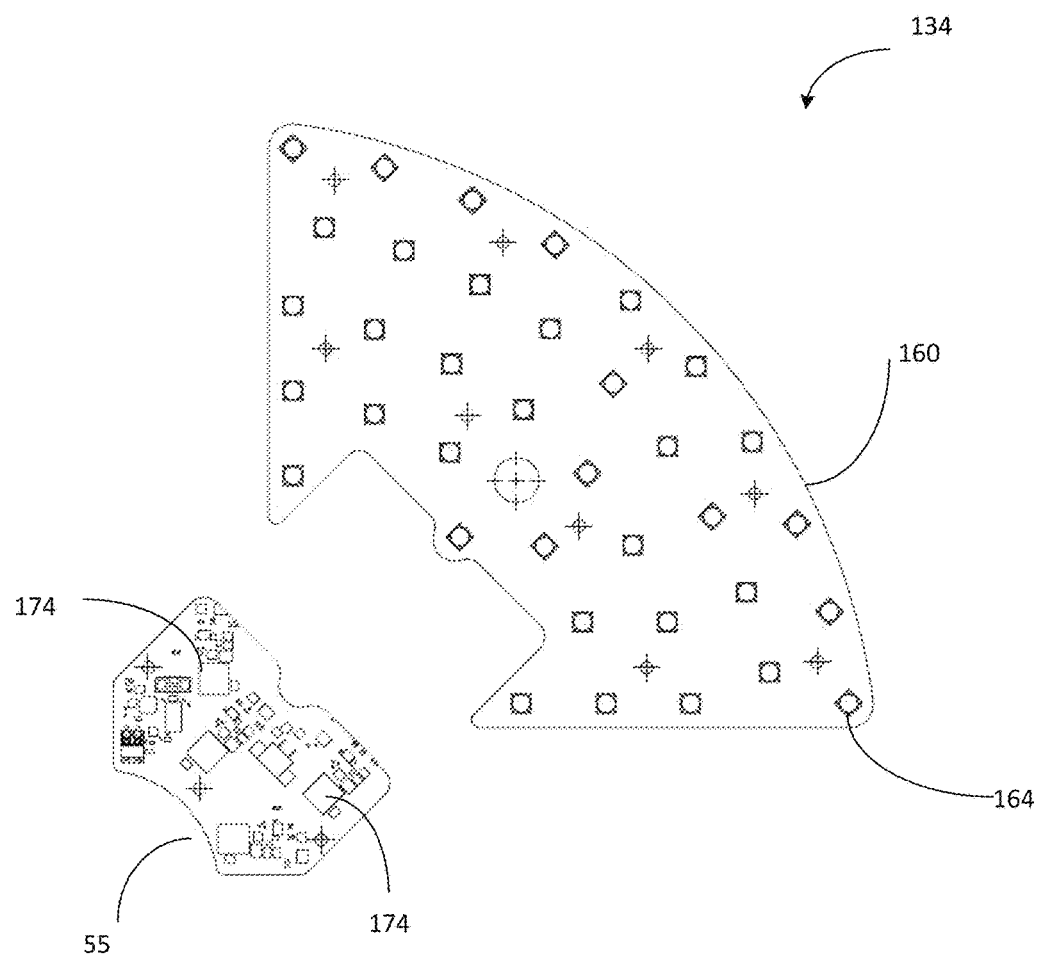
FIG. 5 illustrates an example of an LED array on a substrate, with a control card.

FIG. 5 illustrates an example of a portion of an LED array module 134. The LED array module includes any number of LEDs 164. The LEDs may be arranged in rows, matrices, or other arrangements with corresponding components supported in place and/or spaced apart to form modules of any number of LEDs. The LEDs may be arranged and mounted on a circuit board 160. Driver circuitry on the circuit board 160 may deliver current to the LEDs, and the LED array modules may include multi-wire connectors with prongs and/or receptacles for connecting to external conductors and/or signal wires, or other LED array modules.

One or more circuit control cards 55 may be positioned under, adjacent to or otherwise near the LED array modules to provide power to the LEDs. The LEDs to which power is supplied may be selectively controlled by control circuitry such as that described below in this document. The control card may include a supporting substrate made of a material such as fiberglass, and a non-transitory computable-readable memory for storing programming instructions and/or monitored data and/or operational history data, one or more processors, a field programmable gate array (FPGA), application specific integrated circuit (ASIC) or other integrated circuit structures, and a received for receiving control signals from an external transmitter. The LED array assembly 134 and control card 55 may be placed within an opening of one end of the housing body.

The circuitry of the control card 55 and or the LED array module 134 may operate to maintain a constant current draw across the LEDs and automatically adjust the intensity of the emitted light in response to feedback collected by the sensors. For example, each LED array module 134 may be arranged so that groups of LEDs are electrically connected in series. Each group may be served by a programmable system on a chip (SoC) 174 which serves to receive a command from telemetry and send duty cycle information to multiple strings of LEDs.

Optionally, any LED module may include several LED strings or groups of different colors. For example, a module may include a red (R) LED series, a green (G) LED series, a blue (B) LED series, and a white (W) LED series. If so, the color of light emitted by the unit may be selectably controlled by the control card in response to external commands as described below. In addition or alternatively, some, all, or portions of the LED arrays may include white LEDs of different temperatures so that they can be selectively driven at different levels to produce variable temperature white light from the same fixture. In addition, any LED module may include various strings or groups, all of which emit white light, but which collectively exhibit a variety of color temperatures. For example, various LED lamps may have LEDs ranging from about 2700K to about 6500K, from about 4000K to about 6500K, some in a range around 5000K, or other ranges and combinations. The different types of LEDs may be relatively evenly distributed throughout the device's LED structure so that the device exhibits a uniform appearance when it emits light.

To control the color or color temperature of light directed to a particular area of an environment, the system's interface device (202 in FIG. 1) may include or be in communication with a processor and computer-readable memory containing programming instructions that enable a user to selectably control the light emitted by the various illumination devices. For example, the environment may be divided into a number of zones, and each illumination device may be assigned to one or more of the zones. When the system receives a command to direct light of a specified color or color temperature to a particular zone, it may identify the illumination devices that should be activated and send a signal containing instructions to the controllers (210a . . . 210n in FIG. 1) for the illumination devices associated with that zone. Each controller may then send a signal to the control card (55 in FIG. 5) of its associated illumination device to selectively activate a group of the devices LED's that will cause the device to emit light of the desired color or color temperature.

Figure 6A:
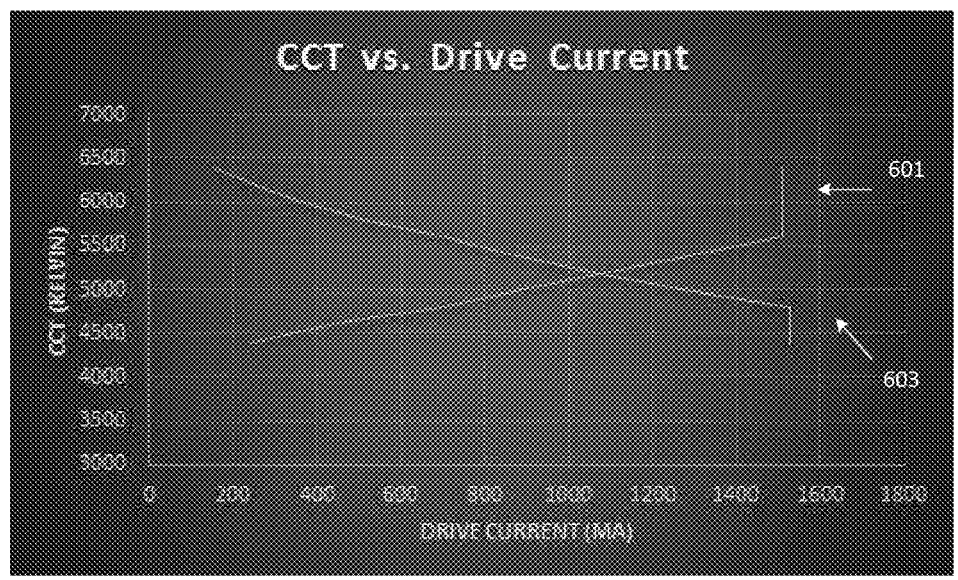
FIGS. 6A and 6B illustrate data that may be used for color tuning of an LED lighting device.

The interface device, controllers, and/or control cards may, when generating their output, identify what drive currents to apply to various groups of LEDs to achieve the desired color or color temperature. The selection of color temperatures for LEDs may vary based on the groups of LEDs that are available in the device. For example, an illumination device may have a first group of 100 LEDs having a color temperature of 4000K and second group of 100 LEDs having a color temperature of 6500K. If the system receives a command to emit light at a specified color temperature, it may use an algorithm, reference a lookup table, or use other suitable methods to determine what drive currents to apply to each group of LEDs to achieve the desired temperature. As a simple example, as illustrated in FIG. 6A, the system may have a table or algorithm that identifies drive currents to apply to the 4000K LEDs (represented by line 603) and the 6500K LEDs (represented by line 601) to a achieve a desired color temperature. Each line may relate to a particular LED drive circuit, as will be described in more detail below in the discussion of FIG. 7. Different drivers may exhibit different characteristics, and the slope and other characteristics of the lines shown in FIG. 6A may vary based on the driver chip that is used. The system may perform diagnostics on a chip to learn this information during an initialization process, or this information may be entered as a data file or manually and then stored for use during operation of the lighting system.

Figure 6B:
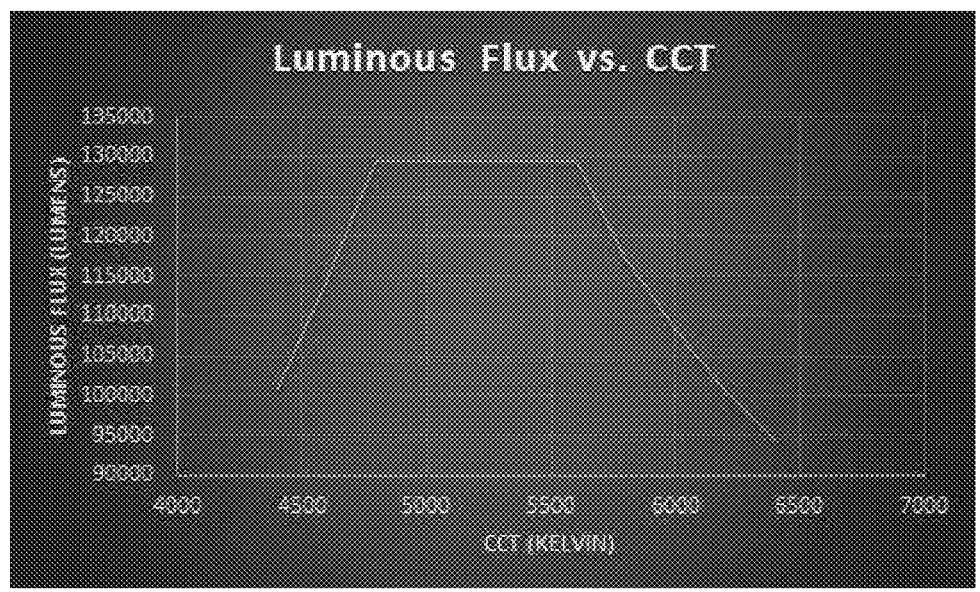

In the example of FIG. 6A, if the desired output is a color temperature of 5000K, the system may drive the 4000K LEDs at a current of 1250 ma and the 6500K LEDs at a drive current of about 900 ma. FIG. 6B illustrates what luminous flux may result from achieving various color temperatures. Thus, desired luminous flux could be as an input, and the system may then determine the color temperature that would yield the luminous flux, and then look up or calculate the required drive currents to achieve the desired luminous flux. FIG. 6B also illustrates plateau parameters at which a light may operate and maintain a substantially constant luminance level. Operating the light in accordance with the parameters in the plateau area may yield a substantially constant luminance level.

In some embodiments, the system may be operated to maintain a constant light output from one or more groups of LEDs so that the light level as measured using any suitable unit of measure, such as lumens output by the light or footcandles measured by one or more sensors positioned at various locations in the lighting environment (e.g., playing field, stage, etc.). Each of these units may be referred to in this document as "luminance" or "intensity" of light, or "illuminance" in the context of an area. All such terms may be used interchangeably in this document, such that a one of these values will be equivalent to another one of these values. Maintenance of substantially constant illuminance may enable the system to maintain substantially constant light levels in all areas of the environment, even while the colors of the light are changing.

In some embodiments, the system also may include a data storage facility comprising sets of scene data. When a user interface receives a selection of a scene, the system may access the data storage facility and retrieve a set of scene data that corresponds to the selected scene. It may then extract an identification of the group of LED devices that correspond to the selected scene from the retrieved scene data. The system also may identify a color selection for each multi-color device in the group having LEDs by, for each such LED device, identifying a first group of LEDs of a first color temperature and a second group of LEDs of a second color temperature. Then, for each of the LED devices that correspond to the group, the system identify a first drive current for the first group of LEDs and a second drive current for the second group of LEDs. The combination of first and second drive currents will cause the system to operate at a substantially constant luminance level and a desired overall color temperature.

Figure 7:
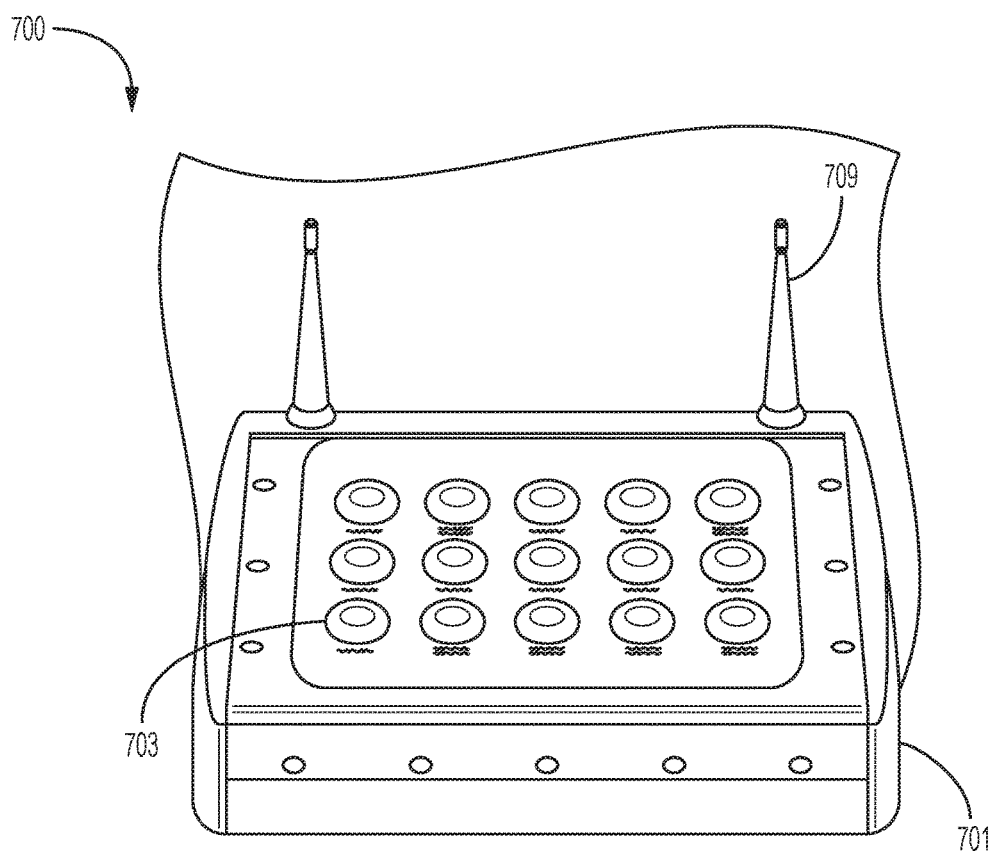
FIG. 7 illustrates an example of a user interface device.

In some embodiments, the system may include a user interface via which a user may define or select a scene. FIG. 7 illustrates an example of such a device 700, in which a set of activators 703 such as buttons, knobs, switches, touch-screen display elements or other user selectable interface elements supported by a housing 701 and which are configured to enable a user to select a scene or define a scene. When a user selects any of the interface elements to request that a set of lights provide a defined scene, circuitry or programming may cause the device to transmit, optionally via a wireless transmitter 709, a command to the device drivers to adjust their settings to implement the scene. The scene may include desired color temperatures, intensities, or other light characteristics at various sections of an environment such as an arena, concert hall, stadium, theater, convention center room, stage, or other area that is to be lit. As noted above, the user interface is an electronic device and/or a software module running on an electronic device that includes inputs by which a user may enter commands that the system will use to selectably control lights. The user interface 700 may have multiple pre-programmed inputs that call for pre-defined scenes. When the desired scene is selected, the user interface may acquire the lookup table or algorithm itself, such as by retrieving it from a local memory or a networked or cloud-based data storage facility. Alternatively, the user interface 700 may send a unique identifier for the scene to one or more lighting devices with which it is in communication, and each device could then use that identifier to could acquire the lookup table or algorithm and establish the settings for each lighting device that match the identified scene.

Figure 8:
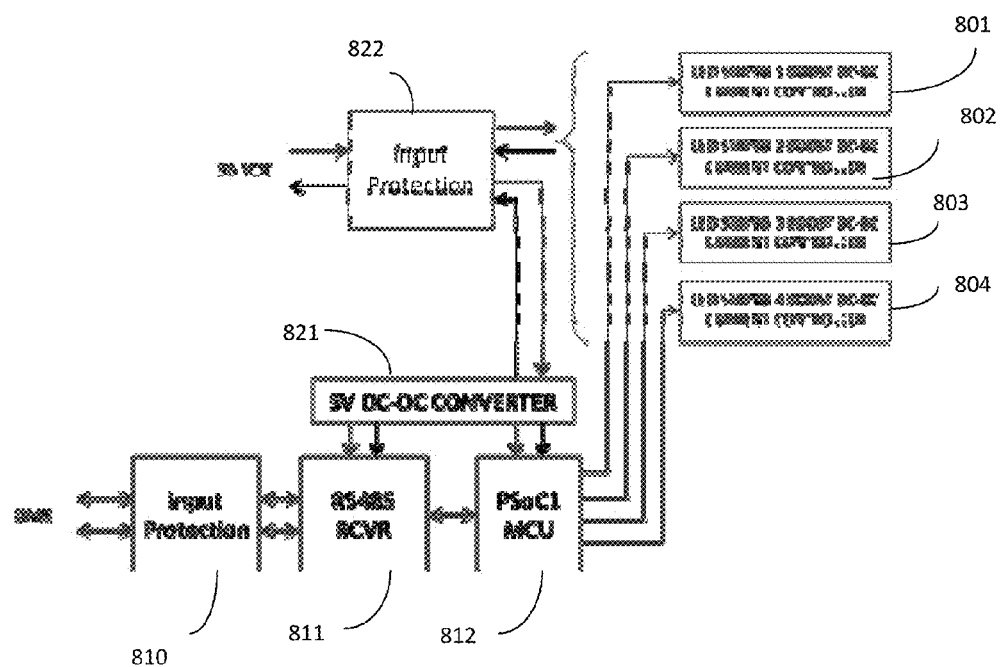
FIG. 8 illustrates example components that may receive signals and selectively control LED groups.

For example, referring to FIG. 8, the system may include a receiver 811 that receives commands and monitored data signals from an external wired or wireless communication device. The receiver may pass the commands to a master control unit 812, such as a processor that implements software or firmware, a computing device, or a programmable system-on-a chip that stores information that can be used to selectively activate various drivers 801-804 that each control current to one or more sets of LEDs. Each driver 801-804 may control a separate illumination device, or a group of LEDs within a particular illumination device. The devices may receive power via a converter 821 which is protected from voltage or current variances by an input protection device 822 such as a surge protector. The receiver also may include input protection 801 such as a firewall or device that protects the receiver against receiving and/or passing to the master control unit unauthorized signals.

The selection of which LED drivers to activate, and at what level, may be determined in real time by the system based on the input of a desired color temperature, intensity or other characteristic of light in a particular zone. For example, the receiver 802 may receive a desired temperature and pass it to the master controller 803, which will also receive monitored data from the zone (such as light intensity or color temperature) and generate commands to select, or increase or decrease current to, a particular group of LEDs for an illumination device that is directed to that zone if the monitored data indicates that the light intensity or color temperature in the zone is below or above the desired temperature by at least a threshold amount. Alternatively, the various commands and drive currents may be stored in a computer-readable memory in association with various scenes, and the system may issue commands corresponding to a scene when a user selects a particular scene.

For example, consider the implementation discussed above of an illumination device having a two strings of LEDs, one with a 4000K color temperature (CCT) and one with a 6500K CCT. The master controller may be programmed to use a formula to select the group of LEDs to drive to achieve the desired temperature. The system may use a set of equations to balance the total light output such as:

drive current for 4000K LEDs=−3242.2 ln(Desired CCT)−26892; and drive current for 6500K LEDs=−3312 ln(Desired CCT)+29674;

whereby the system sets the drive currents applied to the LED groups in each affected lighting device so that (4000K drive current)+(6500K drive current) is always less than or equal to a maximum total drive current of 2300 mA.

When the system receives a command to change the color temperature output by the light, the system may automatically adjust the light intensity directed to the environment by increasing or decreasing the drive current for some or all of the LEDs that are used to operate at the new color temperature. For example, the system may use the two equations to balance the total light output of the fixture or group of fixtures, so that as one string of LEDs is driven with higher current, an adjacent string (or another selected string) is driven with less current. Selection of other color temperature LEDs may require a different set of equations. The equations may be implemented in software, firmware, programmed onto a chip, or applied in a custom control interface which then sends the commands to the master controller via the receiver. A user may fine tune the color temperature by using a user interface (such as a control device) to increase or decrease a desired CCT. The system may then increase the drive current in one group of LEDs having a first color temperature, while simultaneously decreasing the drive current in a second group of LEDs having a different color temperature, to achieve the desired CCT output and light intensity.

As noted above, various sensors, such as light intensity, color rendering index (CRI) sensors, $D_{uv}$ sensors, and/or color temperature sensors, may be located on the playing surface, stage, or other lighting environment. The sensors may be arranged in any suitable arrangement, such as a grid. The sensors may be either permanently installed, or portable to be installed temporarily for calibration events. Once sensors are in place, an optional calibration event may begin. In the calibration event, all data will be acquired in a zone through one data acquisition event. Both light intensity and color temperature in the lighting environment, as well as other parameters such as CRI or $D_{uv}$ may be acquired at this time. Zone size will be dependent on the number and placement of sensors.

The sensors may be in electronic communication with a master controller. Once data is acquired by the sensors, to continue the calibration they may send the information to the controller (such as the master controller, or another processing device), which will perform a calculation that uses the received intensity or color temperature information and a reference level as variables and determines whether or how much to change (increase or decrease) the drive current to apply to each luminaire (or individual sets of LEDs within a luminaire) that is positioned to direct light to that zone. An example equation used in this scenario follows:

$$\Delta \text{Drive Current} = 1.33 \times \frac{(\text{Target Intensity} - \text{Acquired Intensity})}{(\text{Acquired Intensity})}.$$

In this equation, the target intensity is a user- or system-specified intensity that is to be maintained in the zone, and the acquired intensity is a sum, average, mean or other composite function of the intensity levels acquired by the sensors in the zone. Other equations may be used in various embodiments. The calibration process may be done during initial facility setup, when initiated later by a user or by a facility change, or in some embodiments automatically at periodic intervals.

The system may then automatically implement the change, and repeat the measuring and adjustment process until the desired color temperature and light intensity are achieved. The system may do this for a group of desired color temperatures and light intensities, and it may store this information in a data storage facility as a data set, such as a lookup table. Then, when the system receives a command to cause light of a desired intensity or color temperature to appear in a zone it may retrieve that data and use it to select the appropriate illumination devices and LED groups to drive, and at what level.

For example, when a user enters a command in the user interface to change the applied scene, or to change the color temperature of light emitted in a zone or by a specific device, the system may select the LEDs to be driven, and drive currents to be applied to each LED group, by looking up the data stored in the calibration process. The same process may occur if a sensor detects that a light characteristic at a particular location has deviated from a threshold level or range. If the selected or threshold color temperature for a group of LEDs does not have associated drive currents stored in the memory, the system may calculate appropriate drive currents using algorithms such as those described above. It may also update the data in the memory to include the newly-calculated drive currents.

In an option where the control card controls the LEDs by pulse width modulation (PWM), an oscillating output from the processor repeatedly turns the LEDs on and off based by applying a pulsed voltage. Each pulse is of a constant voltage level, and the control circuitry varies the width of each pulse and/or the space between each pulse. When a pulse is active, the LEDs may be turned on, and when the pulses are inactive the LEDs may be turned off. If the duty cycle of the "on" state is 50%, then the LEDs may be on during 50% of the overall cycle of the control pulses. The pulses are delivered rapidly so that the human eye does not detect a strobing effect—at least 24 pulses per second. The control card may dim the lights by reducing the duty cycle—and effectively extending the time period between each "on" pulse—so that the LEDs are off more than they are on. Alternatively, the control card may increase the brightness of the LEDs by increasing the duty cycle. The system may selectively change the PWM applied to a lighting device when it changes other characteristics (such as CCT) in order to maintain substantially constant illuminance in an area while changing the CCT or other characteristics.

The control card may receive data from the various sensors in the environment and apply that data to a rule set to determine whether to increase, decrease, or maintain the intensity of the LEDs. For example, if a sensor detects that the illuminance of light in the vicinity of the sensor exceeds a threshold, the control card may receive this information and in response cause the LEDs to dim by reducing the voltage output of each transformer and/or reducing the duty cycle of the LEDs in the module. When used in this document, the term "threshold" may refer to a value, or it may refer to a range of values with an upper and lower value. Each such option is intended to be included within the scope of the term.

For example, an illumination device may have a first set of LEDs having a CCT of 4000K and second set of LEDs having a CCT of 6500K. The light fixture control card may include programming to maintain the light emitted by the device at a threshold level or threshold range. When the sensor detects that the emitted light exceeds or falls below the threshold, the control card may implement a process that applies an algorithm, references a lookup table, or use other suitable methods to determine what drive currents to apply to each of the groups of LEDs to achieve the desired CCT. For example, if the desired output is a CCT of 5000K, the system may drive the 4000K LEDs at a current of 1250 ma and the 6500K LEDs at a drive current of about 900 ma. The same process or a similar process may be applied when the sensor measures $D_{uv}$. The algorithms and lookup table amounts may be set so that the system does substantially change the illuminance level measured by light intensity sensors in the sensor department when the drive current changes are implemented.

Alternatively, the system may maintain the output of each illumination device even as the lighting source degrades over time due to dust collecting on the lenses, yellowing of the lenses caused by exposure to ultraviolet (UV) light, movement of the light, or other factors. To do this, as illustrated in FIG. 1, various sensors 205a . . . 205n may monitor properties of the light emitted. When the system determines that the intensity of light in an area has been reduced to a threshold, or by at least a threshold amount over a time period, it may alert the interface device 202 and/or controllers 210a . . . 210n, which in response may generate commands that cause the control cards of the relevant illumination device to increase the current delivered to LEDs, this increasing their output.

Figure 9:
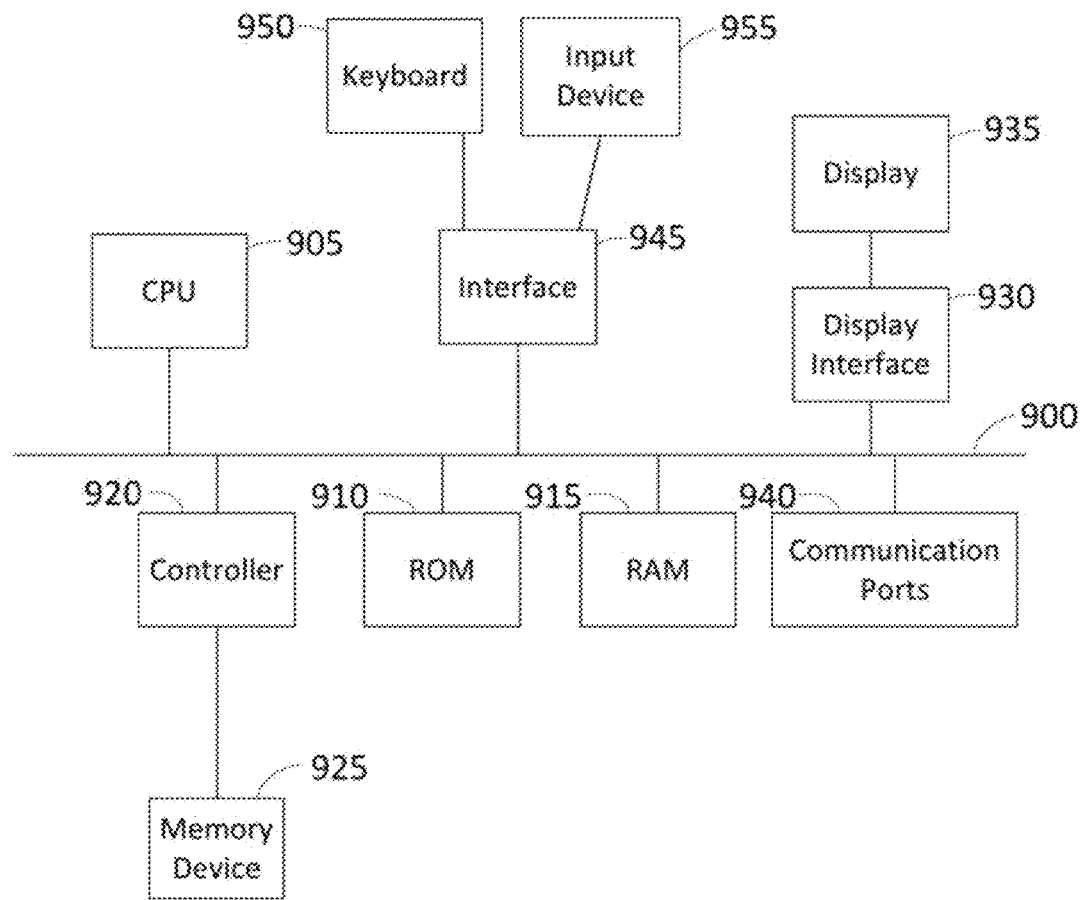
FIG. 9 illustrates example components of an electronic device that may implement a user interface.

FIG. 9 depicts an example of internal hardware that may be used to contain or implement the various processes and systems as discussed above that relate to a user interface and/or controller. An electrical bus 900 serves as an information highway interconnecting the other illustrated components of the hardware. A computing device will include one or more processors. CPU 905 is a central processing unit of the system, performing calculations and logic operations required to execute a program. CPU 905, alone or in conjunction with one or more of the other elements disclosed in FIG. 9, is a processing device, computing device or processor as such terms are used within this disclosure. As used in this document, the terms "processor" and "processing device" may include a single processor or a group of processors that collectively perform various steps of a process. Read only memory (ROM) 910 and random access memory (RAM) 915 constitute examples of memory devices. As used in this document, the terms "computer-readable medium," "memory" or "memory device" are used interchangeably and may include a single memory device, a group of memory devices, or a sector or other subdivision of such a device.

A controller 920 interfaces with one or more optional memory devices 925 that service as data storage facilities to the system bus 900. These memory devices 925 may include, for example, an external DVD drive or CD ROM drive, a hard drive, flash memory, a USB drive, a distributed storage medium such as a cloud-based architecture, or another type of device that serves as a data storage facility. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 930 may permit information from the bus 900 to be displayed on the display 935 in audio, visual, graphic or alphanumeric format. Communication with external devices may occur using various communication ports 940. A communication port 940 may be attached to a communications network, such as the Internet, a local area network or a cellular telephone data network.

The hardware may also include an interface 945 which allows for receipt of data from input devices such as a keyboard 950 or other input device 955 such as a remote control, a pointing device, a video input device and/or an audio input device.

Figure 10:
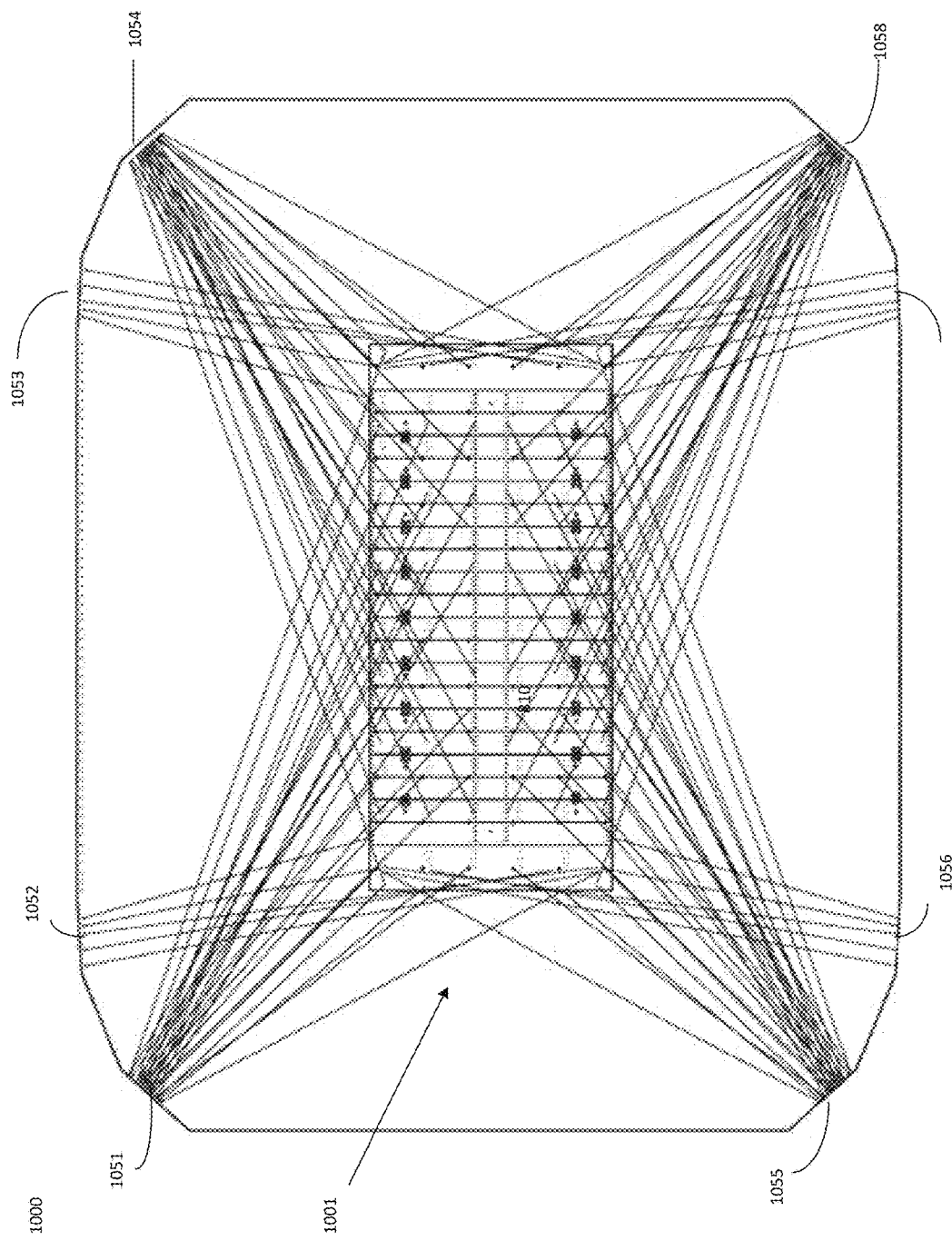
FIG. 10 illustrates an example of an environment in which lighting devices and sensors may be used in the context of various embodiments.

FIG. 10 illustrates an example of a lit environment 1000, in this case a football field that is to be an illuminated surface 1001 in a stadium, in which a set of LED lighting devices 1051-1058 are positioned at various locations and which direct light to the illuminated surface 1001. The sensors (represented by dark circles on the illuminated surface 1001) may measure characteristics of the light and send the information to a controller. Thus, the illumination devices are positioned at various locations of an entertainment facility, and the sensors are located proximate to a playing surface or stage of the facility.

Each sensor may be assigned to a zone—i.e., an area of the illuminated surface—and may thus gather characteristics of light directed to the zone, such as color temperature, $D_{uv}$ and intensity. When a system controller receives a command to implement a scene at a particular zone, the controller will access a data set and receive parameters that correspond to the scene, such as one or more areas affected by the scene, color temperatures and light intensities associated with each area for the scene, and an identification of the lighting devices that direct light to areas of the scene. For example, the controller may access a data storage facility with various scene data, retrieve a set of scene data that corresponds to the selected scene, and extract from the scene data an identification of the lighting devices that correspond to the scene. The controller may then cause the affected light fixtures to automatically alter their color temperature and/or light intensity output so that the desired color temperatures and light intensities are directed to each area of the illuminated surface that is part of the scene. Optionally, if a sensor for an area detects that the color temperature or intensity (illuminance level) has deviated from the values assigned to that area for the scene, then when the controller receives this information it may generate a command that causes one or more of the lighting devices to alter their color temperature or brightness of output light in order to achieve the assigned values in the affected area.

The sensors such as those shown in FIG. 10 may be installed on a surface and used to collect light measurement data and transmit the data to the controller to make real-time adjustments during an event. Alternatively, or in addition the sensors may be used for calibration of the system or collection of data to define a scene. For example, a sensor may be positioned in a location, and various lighting devices may be directed to the location while the sensor collects color temperature, intensity, CRI, $D_{uv}$, or other light characteristic data. The data may be collected by manually placing the sensor at each target location, or the sensor may be placed on or in a robotic transport device, such as a manually operated vehicle or drone. Optionally, the vehicle or drone may be programmed with location and route data so that it automatically moves throughout the facility to collect data. When the sensor reaches each location, it may be positioned at various angles with respect to the plane of the ground to collect measure characteristics of light received at various angles. For example, the sensor may be positioned so that it receives light from a horizontal direction, a vertical direction, and/or any angle in between. The positioning may occur manually, or the robotic transport device may include one or more motors, axles or other components that can rotate the sensor and automatically collect light from various angles.

If the sensed data does not match the desired data for a location, then the lights may be adjusted using drive current variation or PWM techniques such as those described above until the desired characteristics are detected. When the desired characteristics are detected, the system may save a record of the lighting system parameters (e.g., drive currents and PWM settings for each light fixture associated with the scene) to the set of scene data. In this way, later, when a user of the user interface selects a scene, all of the data for all lighting devices associated from the scene may be retrieved from the data set, and commands to cause each affected lighting device to operate according to the scene's parameters may be sent to the lighting devices. The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A lighting system, comprising:
   a plurality of light emitting diode (LED) illumination devices, each of which comprises:
      a first group of LEDs of a first color temperature,
      a second group of LEDs of a second color temperature, and
      a device driver;
   a user interface comprising one or more user input structures;
   a sensor positioned in a zone of an environment, wherein the sensor is comprises a color temperature sensor or a light intensity sensor; and
   a controller comprising a processor, a non-transitory memory containing programming that is configured to cause the processor to:
      perform a calibration event for the zone in which the sensor is located by:
         receiving information from the sensor,
         comparing the received information to a reference level,
         determining a change to drive current or pulse width modulation (PWM) for one or more LEDs of one or more of the LED illumination devices associated with the zone,
         commanding the device drivers for one or more of the LED illumination devices associated with the zone to implement the change, and
         when the sensor detects the reference level, storing the change to a data set.

2. The system of claim 1, further comprising additional programming that is configured to cause the processor to:
   receive, from the user interface, a selection of a scene, wherein the scene corresponds to a requirement to direct light of a specified color temperature or illuminance level to a location in the environment;
   identify a set of the illumination devices that correspond to the scene;
   use the data set to generate commands to cause the device drivers for each of the identified illumination devices to control their corresponding illumination devices so that the specified color temperature or illuminance level of light will be received at the location; and
   transmit the commands to the device drivers for the illumination devices that correspond to the scene.

3. The lighting system of claim 2, wherein:
   the reference level comprises a color temperature level; and
   the commands that cause the device drivers to control their corresponding illumination devices comprise instructions to increase drive current delivered to the first group of LEDs and decrease drive current delivered to the second group of LEDs in the one or more illumination devices associated with the zone so that the reference level will be received at the location.

4. The lighting system of claim 2, wherein:
   the reference level comprises an illuminance level; and
   the commands that cause the device drivers to control the one or more illumination devices associated with the zone so that the reference level will be received at the location by:
      automatically reducing the brightness of one of the groups of LEDs in each illumination device by decreasing a width of voltage pulses applied to that group of LEDs or increasing spacing between voltage pulses applied to that group of LEDs; and
      automatically increasing the brightness of the other group of LEDs in each illumination device by increasing a width of voltage pulses applied to that group of LEDs or decreasing spacing between voltage pulses applied to that group of LEDs.

5. The lighting system of claim 2, wherein the instructions to identify the set of LED illumination devices that correspond to the scene comprise instructions to:
access a data storage facility comprising sets of scene data;
retrieve a set of scene data that corresponds to the scene; and
extract an identification of the group of LED devices that correspond to the scene from the retrieved scene data.

6. The lighting system of claim 1, further comprising:
the sensor comprises a light intensity sensor; and
the programming that is configured to cause the controller to perform the calibration comprises programming that is configured to cause the processor to:
receive light intensity data from the light intensity sensor,
compare the received light intensity data to a reference intensity level,
command the device drivers for the one or more LED illumination devices associated with the zone to use PWM to alter brightness of light produced by LEDs in each of the one or more illumination devices until the light intensity sensor detects the reference intensity level in the zone, and
when the light intensity sensor detects the reference intensity level, store PWM settings that are then in effect to the data set as the change.

7. The lighting system of claim 1, further comprising:
the sensor comprises a color temperature sensor; and
the programming that is configured to cause the controller to perform the calibration comprises programming that is configured to cause the processor to:
receive color temperature data from the color temperature sensor,
compare the received color temperature data to a reference color temperature level,
command the device drivers for the one or more LED illumination devices associated with the zone to increase drive current delivered to the first group of LEDs and decrease drive current delivered to the second group of LEDs in their corresponding illumination devices until the color temperature sensor detects the reference color temperature in the zone, and
when the light intensity sensor detects the reference color temperature, store drive currents that are then in effect to the data set as the change.

8. The lighting system of claim 1, wherein the sensor is attached to a robotic transport device.

9. A method of controlling a lighting system, comprising:
operating a plurality of light emitting diode (LED) illumination devices in an environment, wherein each illumination device comprises a device driver;
by a controller:
performing a calibration event for a zone of the environment in which a sensor that comprises a color temperature sensor or a light intensity sensor is located by:
receiving data from the sensor,
comparing the received data to a reference level,
determining a change to drive current or pulse width modulation (PWM) for one or more LEDs of one or more LED illumination devices associated with the zone,
commanding one or more device drivers for the one or more illumination devices associated with the zone to implement the change, and
when the sensor detects the reference level, storing the change to a data set.

10. The method of claim 9, further comprising, by the controller:
receiving a selection of a scene, wherein the scene corresponds to a requirement to direct light of a specified color temperature or illuminance level to a location in the environment;
identifying a set of the illumination devices that correspond to the scene;
using the data set to generate commands to cause the device drivers for each of the identified illumination devices to control their corresponding illumination devices so that the specified color temperature or illuminance level of light will be received at the location; and
sending the commands to the device drivers for the illumination devices that correspond to the scene.

11. The method of claim 9, wherein:
the reference level comprises a color temperature level;
each illumination device comprises a first group of LEDs of a first color temperature and a second plurality of LEDs of a second color temperature; and
the commands that cause the device drivers to control their corresponding illumination devices comprise instructions to increase the drive current delivered to the first group of LEDs in each corresponding device and decrease the drive current delivered to the second group of LEDs in each corresponding device.

12. The method of claim 9, wherein:
the reference level comprises an illuminance level; and
the commands that cause the device drivers to control their corresponding illumination devices s comprise commands to:
automatically reduce the brightness of one of the groups of LEDs by decreasing a width of voltage pulses applied to that group of LEDs or increasing spacing between voltage pulses applied to that group of LEDs, and
automatically increase the brightness of the other group of LEDs by increasing a width of voltage pulses applied to that group of LEDs or decreasing spacing between voltage pulses applied to that group of LEDs,
so that the specified illuminance level will be received at the location.

13. The method of claim 9, wherein identifying the group of LED illumination devices that correspond to the scene comprises:
accessing a data storage facility comprising sets of scene data;
retrieving a set of scene data that corresponds to the scene; and
extracting an identification of the group of LED devices that correspond to the scene from the retrieved set of scene data.

14. The method of claim 9, wherein:
the sensor comprises a light intensity sensor; and
the method further comprises, by the controller, performing the calibration event for the zone by:
receiving light intensity data from the light intensity sensor,
comparing the received light intensity data to a reference intensity level, commanding one or more device drivers for one or more of the illumination devices associated with the zone to use PWM to alter brightness of light produced by LEDs in each illumination device until the sensor detects the desired intensity level in the zone, and when the light intensity sensor detects the reference intensity level, storing PWM settings that are then in effect to the data set.

15. The method of claim 9, wherein:

the sensor comprises a color temperature sensor; and the method further comprises, by the controller, performing the calibration event for the zone by:

receiving color temperature data from the color temperature sensor, comparing the received color temperature data to a reference color temperature level, commanding one or more device drivers for one or more of the illumination devices associated with the zone to increase drive current delivered to the first group of LEDs and decrease drive current delivered to the second group of LEDs in their corresponding illumination devices until the color temperature sensor detects the reference color temperature in the zone, and when the color temperature sensor detects the reference color temperature level, storing PWM settings that are then in effect to the data set.

16. The method of claim 9, wherein the sensor is attached to a robotic transport device, and the method further comprises causing the robotic transport device to move to multiple zones in the environment and performing the calibration event in each of the zones.

17. A method of controlling a lighting system, comprising:

operating a plurality of light emitting diode (LED) illumination devices in an environment, wherein each illumination device comprises a device driver;

positioning in a zone of the environment a light intensity sensor that is configured to measure an illuminance level of light; and by a controller, performing a calibration event for the zone of the environment in which the light intensity sensor is located by:

receiving a measured illuminance level from the light intensity sensor, comparing the measured illuminance level to a reference value, commanding one or more device drivers for one or more illumination devices associated with the zone to alter a color temperature, intensity level, or both of light directed to the zone, and when the light intensity sensor detects the reference value, storing settings for the one or more illumination devices that are then in effect to a data set for a scene.

18. The method of claim 17, wherein commanding the one or more device drivers comprises commanding the device drivers for the one or more illumination devices to, until the light intensity sensor detects a reference level in the zone:

automatically reduce the brightness of a first group of LEDs in the one or more illumination devices by decreasing a width of voltage pulses applied to the first group of LEDs or increasing spacing between voltage pulses applied to the first group of LEDs, and automatically increase the brightness of a second group of LEDs in the one or more illumination devices by increasing a width of voltage pulses applied to that group of LEDs or decreasing spacing between voltage pulses applied to the second group of LEDs.

19. The method of claim 17, wherein positioning the light intensity sensor in the zone comprises operating a robotic transport device to which the light intensity sensor is attached so that the robotic transport device positions the light intensity sensor in the zone and moves the light intensity sensor to measure the illuminance level from a plurality of angles.

* * * * *